Nov. 15, 1932.  J. M. KENNEDY  1,887,931
BOTTLE
Filed Nov 3, 1930

INVENTOR
J. M. KENNEDY
By E. M. Harrington
ATTORNEY

Patented Nov. 15, 1932

1,887,931

UNITED STATES PATENT OFFICE

JOSEPH M. KENNEDY, OF ST. LOUIS, MISSOURI

BOTTLE

Application filed November 3, 1930. Serial No. 493,220.

This invention relates generally to bottles and more specifically to an improved bottle provided with means for measuring predetermined amounts of liquid therefrom, the predominant object of the invention being to provide a bottle of this type which is so constructed that it will not be necessary for the user of the bottle to be provided with a spoon, or other measuring device, for the purpose of measuring predetermined amounts of the liquid contents from the bottle.

As is quite generally known medicines and other liquids which are dispensed in bottles usually are used by withdrawing predetermined amounts of the liquid from the bottles, in the case of medicines these amounts ordinarily being in doses of one or more spoonfuls of the medicines. It frequently happens that the user of such a bottle is not provided with a spoon, as in the home the spoons may be in a remote part of the house, while in the case of a person who is required to carry a bottle of medicine about on his person a spoon is seldom at hand because of the inconvenience of carrying and using same.

To obviate the necessity that a person be provided with a spoon of the proper size for measuring out amounts of liquid in a bottle, I have devised the bottle disclosed herein which, briefly stated, is provided with a measuring compartment which communicates with the interior of the neck portion of the bottle. In use the bottle is tipped so as to cause the measuring well or compartment to receive liquid from the body portion of the bottle after which an adjustable cork is moved and the bottle is returned to its upright position to cause the main body of liquid in the bottle to be returned to the body portion of the bottle. In this manner a small body of liquid is trapped in the measuring well or compartment and segregated from the remainder of the liquid within the bottle. The user may then pour out the contents of the measuring well or compartment into a receptacle or may raise the bottle to the lips and discharge the contents of the measuring well or compartment into the mouth, whereby a predetermined amount of the liquid will be taken.

Figure 1:
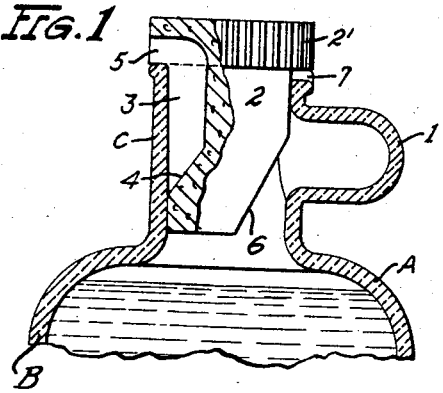
Figure 1 is a vertical section of the upper portion of a bottle constructed in accordance with this invention.

In the drawing, wherein is shown for the purpose of illustration, merely, several embodiments of the invention, A designates my improved bottle generally, said bottle comprising a body portion B and a neck portion C. The body portion B of the bottle A is constructed in the manner common to bottles of the type to which this invention relates and, therefore, in the drawing, the lower portion of said body portion has been broken away to conserve space.

The neck portion C of the bottle A is so formed that a measuring well or compartment 1 is provided, said measuring well or compartment preferably being in the form of a hollow protuberance formed integrally with and extended outwardly from the outer surface of the neck portion of the bottle. The cavity 1' within the hollow protuberance providing the measuring well or compartment 1 is in direct communication with the interior of the neck portion C of the bottle, as shown clearly by the drawing.

Figure 5:
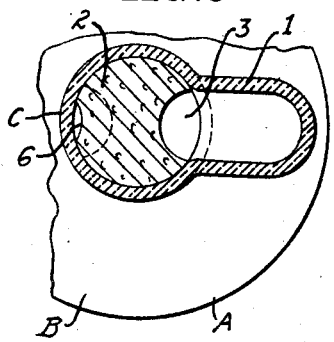
Figure 5 is a horizontal section on line 5—5 of Figure 3.

Inserted in the upper end of the neck portion of the bottle A is a cork 2, said cork preferably being provided with an upper portion 2' which is of slightly larger diameter than the lower portion of the cork, and said cork portion 2′ preferably being provided with a roughened or irregular surface to facilitate gripping the cork with the fingers when it is being manipulated in a manner to be hereinafter set forth. The cork 2 is provided with a passageway 3 which is cut into the surface thereof, said passageway being open at the surface of the cork as shown in Figure 5. The passageway 3 extends longitudinally of the cork as shown clearly in Figures 1 to 4 inclusive, and said passageway terminates at its lower end in an inclined wall 4 which extends from the base or bottom of the passageway to the outer surface of the cork. At its upper end the passageway 3 is provided with a laterally extended portion 5 which is open at the side face of the portion 2′ of the cork. At a point diametrically opposed to the point at which the passageway 3 is located the cork 2 is provided with a cutaway portion which provides an inclined face 6.

The upper edge of the neck portion C of the bottle is provided with a depression 7 which serves to assist in the control of the liquid when it is poured from the measuring well or compartment 1 in the manner to be hereinafter explained.

When my improved bottle is not in use it is disposed in an upright position as illustrated in Figure 1 and the cork 2 is positioned as shown in the view referred to; that is to say the passageway 3 in the cork is located at the side of the neck portion of the bottle opposite to the side thereof at which the measuring well or compartment is located. With the cork in the position illustrated in Figure 1 the neck portion of the bottle is completely sealed so that no liquid from within the body portion of the bottle may pass from the bottle through the neck portion thereof. Also it will be noted that when the cork is positioned as described the cavity 1′ within the protuberance providing the measuring well or compartment 1 is in direct communication with the interior of the body portion of the bottle due to the location of the cutaway portion of the cork as defined by the inclined face 5.

Figure 2:
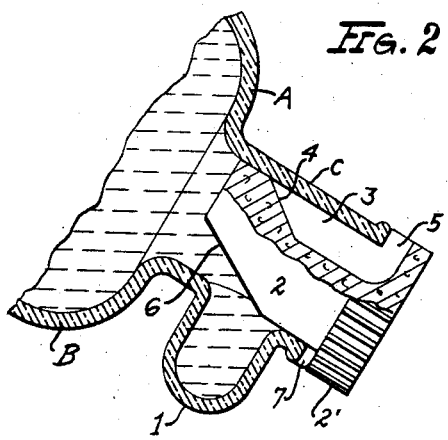
Figure 2 is a view similar to Figure 1 but showing the bottle when it has been tipped to fill the measuring well or compartment.
Figure 3:
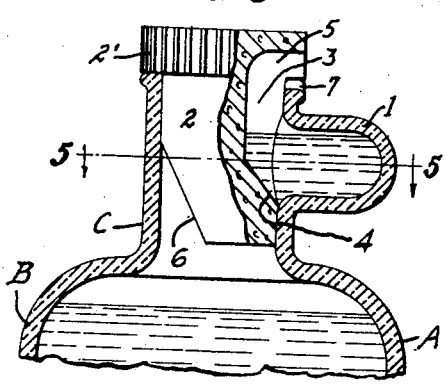
Figure 3 is a view similar to Figures 1 and 2 but showing the bottle after it has been returned to its upright position after the tipping operation and after the position of the cork of the bottle has been altered.
Figure 4:
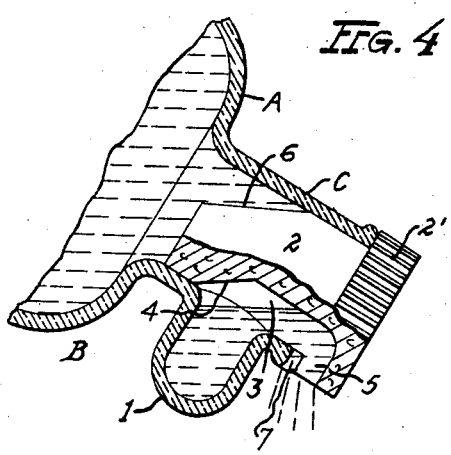
Figure 4 is a view similar to Figures 1, 2, and 3, illustrating the manner in which the measured liquid is withdrawn from the measuring well or compartment.

Assume now that it is desired to withdraw from the bottle a predetermined amount of the liquid contained therein. The cavity 1′ within the protuberance providing the measuring well or compartment 1 is of such dimensions that it will hold a predetermined amount of liquid, a teaspoonful for instance, plus space for air, and by tipping the bottom of the bottle upwardly, as illustrated in Figure 2, liquid within the body portion of the bottle will be caused to flow into the measuring well or compartment 1. During such tipping of the bottle it is obvious that the cork 2 will prevent passage of liquid from the bottle through the neck portion thereof. When the point is reached where no more liquid will flow into the measuring well or compartment 1 the cork 2 is turned with respect to the neck portion of the bottle so as to locate the passageway 3 thereof in the position in which said passageway is located in Figure 3; that is to say said passageway will be located immediately adjacent to and in communication with the interior of the measuring well or compartment 1. With the cork so positioned the liquid within the measuring well or compartment will be trapped therein as illustrated in Figure 3, and because the portion 5 of the passageway 3 is open at the outer face of the cork, the liquid within said measuring well or compartment 1 may be poured therefrom into a receptacle, or the open end of the passageway portion 5 may be placed to the lips and the contents of the measuring well or compartment discharged into the mouth.

Figure 6:
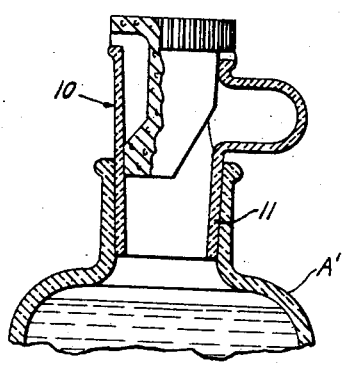
Figure 6 illustrates a modified form of the invention.
Figure 7:
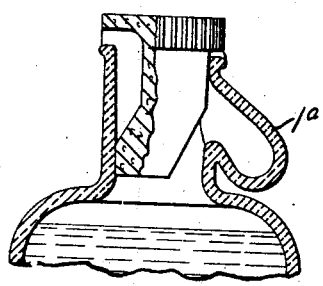
Figure 7 is a fragmentary sectional view illustrating another modified form of the invention.

In Figure 6 I illustrate a modified form of the invention which involves providing an independent measuring device constructed in the manner of the neck portion of the bottle illustrated in Figures 1 to 5 inclusive or Figure 7. The measuring device 10 illustrated in Figure 6 is not a part of the neck portion of the bottle A′ illustrated in said view but instead is provided with a lower portion 11 which is capable of being introduced into the neck portion of an ordinary bottle as a cork would be introduced into said neck portion of said bottle. Aside from the fact that the measuring device is separate from the neck portion of the bottle, the construction and use of said measuring device is the same as the neck portion of the bottle illustrated in the other views of the drawing and, therefore, it will not be necessary to again describe this construction and use.

In Figure 7 the measuring well or compartment 1ª hangs downwardly slightly instead of being extended straight outwardly. The construction illustrated in Figure 7 has the advantage that the bottle may be moved to an upright position before the cork is moved from the position illustrated in Figure 2 to that position illustrated in Figure 3.

In this specification and in the claims forming a part thereof I refer to the element 2 as being a "cork". However, I intend that this term be interpreted to mean a stopper of any desired shape formed of any suitable material.

I claim:

1. A measuring device for bottles, comprising a neck portion, a measuring well associated with said neck portion, said measuring well being entirely closed to the passage of liquid to or from same except through said neck portion, and adjustable means comprising a cork provided with a discharge passageway formed therein, said discharge passageway being open at one side only of said adjustable means, and said adjustable means being movable to positions where said passageway is out of or in communication with said measuring well.

2. A measuring device for bottles, comprising a neck portion, a measuring well associated with said neck portion, said measuring well being entirely closed to the passage of liquid to or from same except through said neck portion, and adjustable means comprising a cork provided with a discharge passageway formed therein, said discharge passageway being open at one side only of said adjustable means, and said adjustable means being movable to positions where said passageway is out of or in communication with said measuring well, and being provided with a cutaway portion providing for the passage of liquid into said measuring well.

3. A measuring device for bottles, comprising a neck portion, a measuring well associated with said neck portion, said measuring well being entirely closed to the passage of liquid to or from same except through said neck portion, and adjustable means comprising a cork provided with a discharge passageway formed therein, said discharge passageway being open at one side only of said adjustable means, and said adjustable means being movable to positions where said passageway is out of or in communication with said measuring well, and being provided with a cutaway portion providing for the passage of liquid into said measuring well, said cutaway portion being offset with respect to said passageway.

4. A measuring device for bottles, comprising a neck portion, a measuring well associated with said neck portion, said measuring well being entirely closed to the passage of liquid to or from same except through said neck portion, and said measuring well being in the form of a hollow protuberance extended outwardly from said neck portion, and adjustable means comprising a cork provided with a discharge passageway formed therein, said discharge passageway being open at one side only of said adjustable means, and said adjustable means being movable to positions where said passageway is out of or in communication with said measuring well.

5. A measuring device for bottles, comprising a neck portion, a measuring well associated with said neck portion, said measuring well being entirely closed to the passage of liquid to or from same except through said neck portion, and said measuring well being in the form of a hollow protuberance formed integral with and extended outwardly from said neck portion, and adjustable means comprising a cork provided with a discharge passageway formed therein, said discharge passageway being open at one side only of said adjustable means, and said adjustable means being movable to positions where said passageway is out of or in communication with said measuring well.

6. A bottle comprising a body portion and a neck portion, a measuring well associated with said neck portion, said measuring well being entirely closed to the passage of liquid to or from same except through the neck portion of said bottle, and adjustable means comprising a cork provided with a discharge passageway formed therein, said discharge passageway being open at one side only of said adjustable means, and said adjustable means being movable to positions where said passageway is out of or in communication with said measuring well.

7. A bottle comprising a body portion and a neck portion, a measuring well associated with said neck portion, said measuring well being entirely closed to the passage of liquid to or from same except through the neck portion of said bottle, and adjustable means comprising a cork provided with a discharge passageway formed therein, said discharge passageway being open at one side only of said adjustable means, and said adjustable means being movable to positions where said passageway is out of or in communication with said measuring well and being provided with a cutaway portion providing for the passage of liquid into said measuring well from the body portion of the bottle.

8. A bottle comprising a body portion and a neck portion, a measuring well associated with said neck portion, said measuring well being entirely closed to the passage of liquid to or from same except through the neck portion of said bottle, and adjustable means comprising a cork provided with a discharge passageway formed therein, said discharge passageway being open at one side only of said adjustable means, and said adjustable means being movable to positions where said passageway is out of or in communication with said measuring well and being provided with a cutaway portion providing for the passage of liquid into said measuring well from the body portion of the bottle, said cutaway portion being offset with respect to said passageway.

9. A bottle comprising a body portion and a neck portion, a measuring well associated with said neck portion, said measuring well being entirely closed to the passage of liquid to or from same except through the neck portion of said bottle, and said measuring well being in the form of a hollow protuberance extended outwardly from said neck portion, and adjustable means comprising a cork provided with a discharge passageway formed therein, said discharge passageway being open at one side only of said adjustable means, and said adjustable means being movable to positions where said passageway is out of or in communication with said measuring well.

10. A bottle comprising a body portion and a neck portion, a measuring well associated with said neck portion, said measuring well being entirely closed to the passage of liquid to or from same except through the neck portion of said bottle, and said measuring well being in the form of a hollow protuberance formed integral with and extended outwardly from said neck portion, and adjustable means comprising a cork provided with a discharge passageway formed therein, said discharge passageway being open at one side only of said adjustable means, and said adjustable means being movable to positions where said passageway is out of or in communication with said measuring well.

In testimony whereof, I have hereunto set my hand.

JOSEPH M. KENNEDY.